United States Patent
Yang et al.

(10) Patent No.: US 11,705,811 B2
(45) Date of Patent: Jul. 18, 2023

(54) BUCK-BOOST CONVERTER AND HYBRID CONTROL METHOD

(71) Applicant: M3 Technology Inc., Taipei (TW)

(72) Inventors: Bo Yang, Allen, TX (US); Xiaoyu Xi, Dallas, TX (US); David Meng, Los Altos, CA (US)

(73) Assignee: M3 Technology Inc., Taipei (TW)

( * ) Notice: Subject to any disclaimer, the term of this patent is extended or adjusted under 35 U.S.C. 154(b) by 149 days.

(21) Appl. No.: 17/094,184

(22) Filed: Nov. 10, 2020

(65) Prior Publication Data
US 2022/0149737 A1 May 12, 2022

(51) Int. Cl.
*H02M 3/158* (2006.01)
*H02M 1/08* (2006.01)
*H02M 1/00* (2006.01)

(52) U.S. Cl.
CPC .......... *H02M 3/1582* (2013.01); *H02M 1/08* (2013.01); *H02M 1/0009* (2021.05)

(58) Field of Classification Search
CPC ..... H02M 1/08; H02M 3/1582; H02M 1/0009
See application file for complete search history.

(56) References Cited

U.S. PATENT DOCUMENTS

| | | | | |
|---|---|---|---|---|
| 7,495,423 B1* | 2/2009 | Knight | ............... | H02M 3/1588 323/259 |
| 9,041,363 B2* | 5/2015 | Tanabe | ............... | H02M 3/1582 323/259 |
| 9,698,690 B2* | 7/2017 | Hang | ................. | H02M 3/1582 |
| 10,250,142 B1* | 4/2019 | Yang | ................. | H02M 3/1582 |
| 10,254,314 B1* | 4/2019 | Li | ...................... | H02M 3/1582 |
| 10,992,231 B1* | 4/2021 | Yang | ................. | H02M 1/0025 |
| 2011/0227550 A1* | 9/2011 | Walters | .............. | H02M 3/1582 323/283 |
| 2011/0279098 A1* | 11/2011 | Ren | ..................... | H02M 3/1582 323/234 |
| 2015/0381039 A1* | 12/2015 | Hari | ...................... | H02M 1/15 323/271 |
| 2017/0187290 A1* | 6/2017 | Li | ...................... | H02M 3/1582 |
| 2018/0358900 A1* | 12/2018 | Sun | ..................... | H02M 3/1582 |
| 2019/0207392 A1* | 7/2019 | Luo | ..................... | H02J 7/0071 |
| 2019/0305666 A1* | 10/2019 | Yang | ................. | H02M 3/1582 |

* cited by examiner

*Primary Examiner* — Gustavo A Rosario-Benitez
(74) *Attorney, Agent, or Firm* — Li Li; AP3 Law Firm, PLLC

(57) ABSTRACT

An apparatus includes a buck converter portion of a buck-boost converter configured to operate under a constant on-time control scheme, wherein an on-time of a high-side switch of the buck converter portion is determined by a buck on-time timer, and a boost converter portion of the buck-boost converter configured to operate under a constant off-time control scheme, wherein an off-time of a low-side switch of the boost converter portion is determined by a boost off-time timer.

18 Claims, 5 Drawing Sheets

BUCK-BOOST CONVERTER AND HYBRID CONTROL METHOD

TECHNICAL FIELD

The present invention relates to a control scheme of a power converter, and, in particular embodiments, to a power converter employing a hybrid control scheme with a constant switching frequency under various operating conditions.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme or the constant off-time scheme can enable power converters to provide fast transient responses. A power converter employing the constant on-time control scheme may only comprise a feedback comparator and an on-timer. In operation, the feedback circuit of the power converter directly compares a feedback signal with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

As electronics devices move toward portable and mobile, many electronic devices rely on rechargeable batteries as their power sources. However, due to the characteristics of the rechargeable batteries, an output voltage of a battery pack could vary in a wide range between a fully charged state and a fully depleted state. In addition, as universal serial bus (USB) Type C has emerged as a new standard for charging and transferring data, the output voltage of a USB port is no longer fixed (e.g., 5 V). Instead, the output voltage may vary in a wide range from about 3.5 V to about 20 V. Meanwhile, downstream power converters connected to the new USB port (e.g., USB Type C) may still need a voltage substantially equal to 5 V. In response to the wide input voltage range, four-switch buck-boost converters have become widespread for USB Type C applications.

In a conventional four-switch buck-boost converter, all four switches are turned on and off once in each switching cycle. In addition, energy of the input power source is never transferred directly to an output of the four-switch buck-boost converter. Instead, energy of the input power source is stored in the inductor of the buck-boost converter first, and then transferred to the output of the converter. Thus, the efficiency of the conventional four-switch buck-boost convert is not high.

It would be desirable to provide an apparatus and/or a method for enabling the conventional four-switch buck-boost converter employing a combination of the constant on-time control scheme and the constant off-time control scheme to operate in a buck mode, a boost mode and a buck-boost mode under different input voltages. Furthermore, it would be desirable to have a smooth transition between any two operating modes above in response to an input voltage variation.

SUMMARY

In particular embodiments, a control scheme may achieve fast transient responses and improve the performance of a four-switch buck-boost converter under a variety of operating conditions.

In accordance with an embodiment, an apparatus comprises a buck converter portion of a buck-boost converter configured to operate under a constant on-time control scheme, wherein an on-time of a high-side switch of the buck converter portion is determined by a buck on-time timer, and a boost converter portion of the buck-boost converter configured to operate under a constant off-time control scheme, wherein an off-time of a low-side switch of the boost converter portion is determined by a boost off-time timer.

In accordance with another embodiment, a method comprises applying a constant on-time control scheme to a buck converter portion of a buck-boost converter, wherein under the constant on-time control scheme, an on-time of a high-side switch of the buck converter portion is determined by a buck on-time timer, and applying a constant off-time control scheme to a boost converter portion of the buck-boost converter, wherein under the constant off-time control scheme, an off-time of a low-side switch of the boost converter portion is determined by a boost off-time timer.

In accordance with yet another embodiment, a controller comprises a first timer for setting a turn-on time of a first high-side switch of a buck-boost converter, wherein the turn-on time of the first high-side switch is determined by an input voltage of the buck-boost converter and an output voltage of the buck-boost converter, a second timer for setting a turn-off time of a second low-side switch of the buck-boost converter, wherein the turn-off time of the second low-side switch is determined by the input voltage of the buck-boost converter and the output voltage of the buck-boost converter, and a current mode control device for setting a turn-on time of a first low-side switch and a turn-off time of a second high-side switch of the buck-boost converter.

An advantage of a preferred embodiment of the present disclosure is improving the performance of a buck-boost power converter. More particularly, the control mechanism of the buck-boost converter is based on a combination of a constant on-time control scheme and a constant off-time control scheme. A buck converter portion of the buck-boost converter is configured to operate under the constant on-time control scheme. A boost converter portion of the buck-boost converter configured to operate under the constant off-time control mode. Furthermore, a combination of a valley current mode (VCM) control scheme and a peak current mode (PCM) control scheme is applied to the buck-boost power converter. In particular, the VCM control scheme is employed to terminate an on-time of a low-side switch of the buck converter portion of the buck-boost converter. The PCM control scheme is employed to terminate an on-time of a low-side switch of the boost converter portion of the buck-boost converter.

The combination of the constant on-time control scheme and the constant off-time control scheme eliminates the need of a fixed clock signal. Furthermore, with the combination of the constant on-time control scheme and the constant off-time control scheme, the transition from a pulse width modulation (PWM) mode to a pulse frequency modulation (PFM) mode can be realized automatically. Moreover, the slope compensation needed for the current mode control can be eliminated. The combination of the constant on-time control scheme and the constant off-time control scheme can greatly simplify the control circuit and the associated current consumption. With the combination of VCM control and PCM control, the output double pole formed by the inductor and the output capacitor can be reduced to a single pole response, thereby making the control loop compensation design much simpler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid control scheme applied to a buck-boost converter. The hybrid control scheme includes both a constant on-time control scheme and a constant off-time control scheme. The constant on-time control scheme is applied to a buck converter portion of the buck-boost converter. The constant off-time control scheme is applied to a boost converter portion of a buck-boost converter. Under this hybrid control scheme, the buck-boost converter is configured to operate in a fixed switching frequency or an almost fixed switching frequency under various operating conditions. In addition, under this hybrid control scheme, the buck-boost converter is able to have a smooth and autonomous transition between a buck operation mode and a boost operation mode. The invention may also be applied, however, to a variety of power converters. Hereinafter, various embodiments will be explained in detail with reference to the accompanying drawings.

Figure 1:
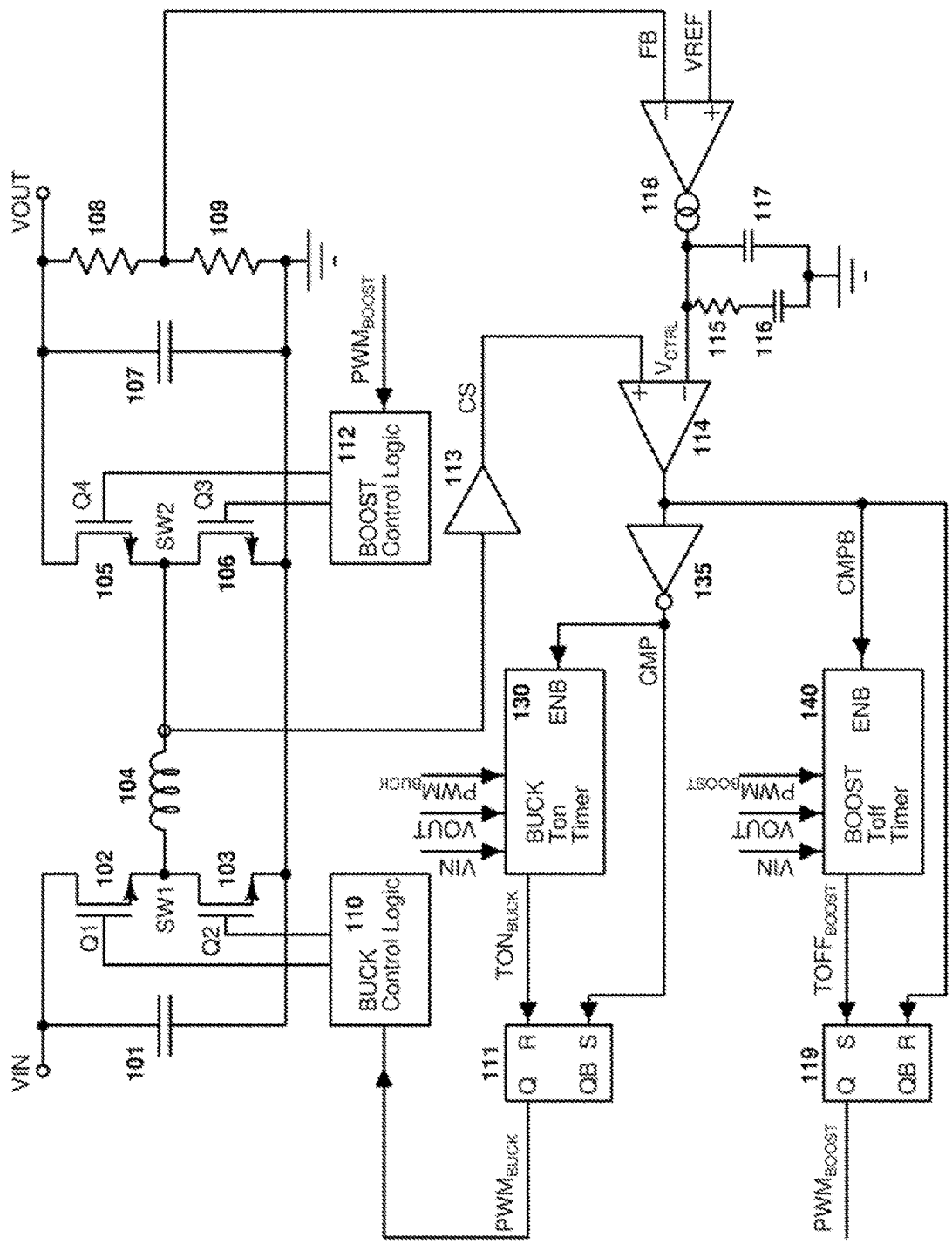
FIG. 1 illustrates a schematic diagram of a buck-boost converter and its associated hybrid control circuit in accordance with various embodiments of the present disclosure.

FIG. 1 illustrates a schematic diagram of a buck-boost converter and its associated hybrid control circuit in accordance with various embodiments of the present disclosure. The buck-boost converter comprises a first high-side switch Q1 (102), a first low-side switch Q2 (103), a second low-side switch Q3 (106), a second high-side switch Q4 (105) and an inductor 104 as shown in FIG. 1. The first high-side switch Q1 and the first low-side switch Q2 are connected in series between a positive terminal and a negative terminal of an input capacitor 101. The input capacitor 101 is connected to a power source VIN. The input capacitor 101 is employed to provide a steady voltage for the buck-boost converter.

The second high-side switch Q4 and the second low-side switch Q3 are connected in series between a positive terminal and a negative terminal of an output capacitor 107. The inductor 104 is coupled between the common node of the first high-side switch Q1 and the first low-side switch Q2, and the common node of the second high-side switch Q4 and the second low-side switch Q3.

The buck-boost converter may be divided into two portions, namely a buck converter portion and a boost converter portion. The buck converter portion may comprise the first high-side switch Q1 and the first low-side switch Q2. The buck converter portion and the inductor 104 may function as a step-down converter. On the other hand, the boost converter portion may comprise the second high-side switch Q4 and second low-side switch Q3. The boost converter portion and the inductor 104 may function as a step-up converter. The buck converter portion, the inductor 104 and the boost converter portion are connected in cascade between the input capacitor 101 and the output capacitor 107.

Both the buck converter portion and the boost converter portion of the buck-boost converter are controlled by a hybrid control circuit. More particularly, the hybrid control circuit comprises a constant on-time control circuit and a constant off-time control circuit. The constant on-time control circuit is configured to apply the constant on-time control scheme to the buck converter portion of the buck-boost converter. The constant off-time control circuit is configured to apply the constant off-time control scheme to the boost converter portion of the buck-boost converter.

As shown in FIG. 1, the hybrid control circuit comprises an amplifier 118, a current comparator 114, a buck on-time timer 130, a boost off-time timer 140, a first latch 111, a second latch 119, a buck control logic unit 110 and a boost control logic unit 112. In some embodiments, the buck on-time timer 130 functions as the constant on-time control circuit. The buck on-time timer 130 is employed to determine an on-time of the first high-side switch Q1. The boost off-time timer 140 functions as the constant off-time control circuit. The boost off-time timer 140 is employed to determine an off-time of the second low-side switch Q3.

The output (CMPB) of the current comparator 114 is fed into an inverter 135 to generate signal CMP. As shown in FIG. 1, CMP is used to determine an on-time of the first low-side switch Q2 or an off-time of the first high-side switch Q1. CMPB is used to determine an on-time of the second low-side switch Q3 or an off-time of the second high-side switch Q4. Throughout the description, the current comparator 114 may be alternatively referred to as a comparator.

As shown in FIG. 1, the hybrid control circuit detects the output voltage VOUT and the current flowing through the inductor 104, and generates a plurality of gate drive signals for driving switches Q1, Q2, Q3 and Q4 accordingly.

In some embodiments, the amplifier 118 is a voltage error amplifier. As shown in FIG. 1, the inverting input (FB) of the amplifier 118 is employed to detect the output voltage VOUT through a voltage divider formed by resistors 108 and 109. The non-inverting input of the amplifier 118 is connected to a predetermined reference VREF. The output of the amplifier 118 is connected to an inverting input of the current comparator 114. A compensation network is connected between the output of the amplifier 118 and ground. The compensation network comprises resistor 115, capacitor 116 and capacitor 117. The resistor 115 and the capacitor 116 are connected in series and further connected in parallel with the capacitor 117. The compensation network helps to stabilize the control loop and provide sufficient phase margin, thereby improving the transient response performance of the buck-boost converter.

The non-inverting input of the current comparator 114 is configured to receive the detected current signal (CS). As shown in FIG. 1, the current flowing through the inductor 104 is detected by a suitable current sensing device such as a dc resistance (DCR) current sensing apparatus. The sensed current signal is fed into the non-inverting input of the current comparator 114 through a current sensing amplifier 113. The current sensing amplifier 113 is employed to provide a suitable current sensing gain.

The first latch 111 is employed to generate gate drive signals for switches Q1 and Q2, respectively. As shown in FIG. 1, the reset input of the first latch 111 is configured to receive the output signal of the buck on-time timer 130. The set input of the first latch 111 is configured to receive the output signal of the current comparator 114 through an inverter 135. As shown in FIG. 1, the CMP signal is fed into the set input of the first latch 111. The output of the first latch 111 is a PWM signal for controlling the buck converter portion of the buck-boost converter. The output of the first latch 111 is applied to the gates of the switches Q1 and Q2 respectively through the buck control logic unit 110. The buck control logic unit 110 is employed to generate a high-side gate drive signal and a low-side gate drive signal based upon the PWM signal generated by the first latch 111. Furthermore, the buck control logic unit 110 adds a suitable delay between the high-side gate drive signal and the low-side gate drive signal. The detailed schematic diagram of the buck on-time timer 130 will be described below with respect to FIG. 2.

The second latch 119 is employed to generate gate drive signals for switches Q3 and Q4, respectively. As shown in FIG. 1, the set input of the second latch 119 is configured to receive the output signal of the boost off-time timer 140. The reset input of the second latch 119 is configured to receive the output signal of the current comparator 114. As shown in FIG. 1, the output of the second latch 119 is a PWM signal for controlling the boost converter portion of the buck-boost converter. As shown in FIG. 1, the output of the second latch 119 is applied to the gates of the switches Q3 and Q4 respectively through the boost control logic unit 112. The boost control logic unit 112 is employed to generate a high-side gate drive signal and a low-side gate drive signal based upon the PWM signal generated by the second latch 119. Furthermore, the boost control logic unit 112 adds a suitable delay between the high-side gate drive signal and the low-side gate drive signal. The detailed schematic diagram of the boost off-time timer 140 will be described below with respect to FIG. 2.

It should be noted that while the example throughout the description is based upon a buck-boost converter and a hybrid control circuit configured to generate gate drive signal for the buck-boost converter (e.g., buck-boost converter shown in FIG. 1), the buck-boost converter as well as the hybrid control circuit shown in FIG. 1 may have many variations, alternatives, and modifications. For example, the hybrid control circuit may detect other necessary signals such as the input voltage, the input current and/or the output current of the buck-boost converter. Furthermore, there may be one dedicated driver or multiple dedicated drivers coupled between the hybrid control circuit and the switches Q1, Q2, Q3 and Q4. In sum, the buck-boost converter and the hybrid control circuit illustrated herein is limited solely for the purpose of clearly illustrating the inventive aspects of the various embodiments. The present disclosure is not limited to any particular power topology and system configurations.

The switches (e.g., Q1) shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates four switches Q1, Q2, Q3, and Q4, various embodiments of the present disclosure may include other variations, modifications and alternatives. For example, the low-side switch Q2 may be replaced by a freewheeling diode and/or the like. The high-side switch Q4 may be replaced by a rectifier diode and/or the like.

Based upon different design needs and applications, the buck-boost converter may be configured to operate in three different operating modes, namely a buck operating mode, a boost operating mode and a buck-boost operating mode. The detailed operating principles of these three operating modes will be described below with respect to FIGS. 3-5, respectively.

In some embodiments, the buck-boost converter is configured to operate in a buck operating mode. In the buck operating mode, switches Q1 and Q2 are controlled by complementary gate drive signals with appropriate switching dead times in the same manner as in a convention buck converter. The switch Q3 is always off and the switch Q4 is always on. The detailed operating principles of the buck operating mode will be described below with respect to FIG. 3.

In some embodiments, the buck-boost converter is configured to operate in a buck-boost operating mode. In the buck-boost operating mode, the buck-boost converter operates in a buck mode and a boost mode in a complementary manner. In some embodiments, the buck-boost converter is able to have a smooth and autonomous transition between a buck operation mode and a boost operation mode based on a relationship between the sensed current signal CS and the error amplifier output voltage signal $V_{CTRL}$. More particularly, the buck-boost converter is configured to operate in the buck mode when the sensed current signal CS is greater than the error amplifier output voltage signal $V_{CTRL}$. On the other hand, the buck-boost converter is configured to operate in the boost mode when the sensed current signal CS is less than the error amplifier output voltage signal $V_{CTRL}$. The detailed operating principles of the buck-boost operating mode will be described below with respect to FIG. 4.

In some embodiments, the buck-boost converter is configured to operate in a boost operating mode. In the boost operating mode, switches Q3 and Q4 are controlled by complementary gate drive signals with appropriate switching dead times in the same manner as in a convention boost converter. Switch Q2 is always off and switch Q1 is always on. The detailed operating principles of the boost operating mode will be described below with respect to FIG. 5.

Figure 2:
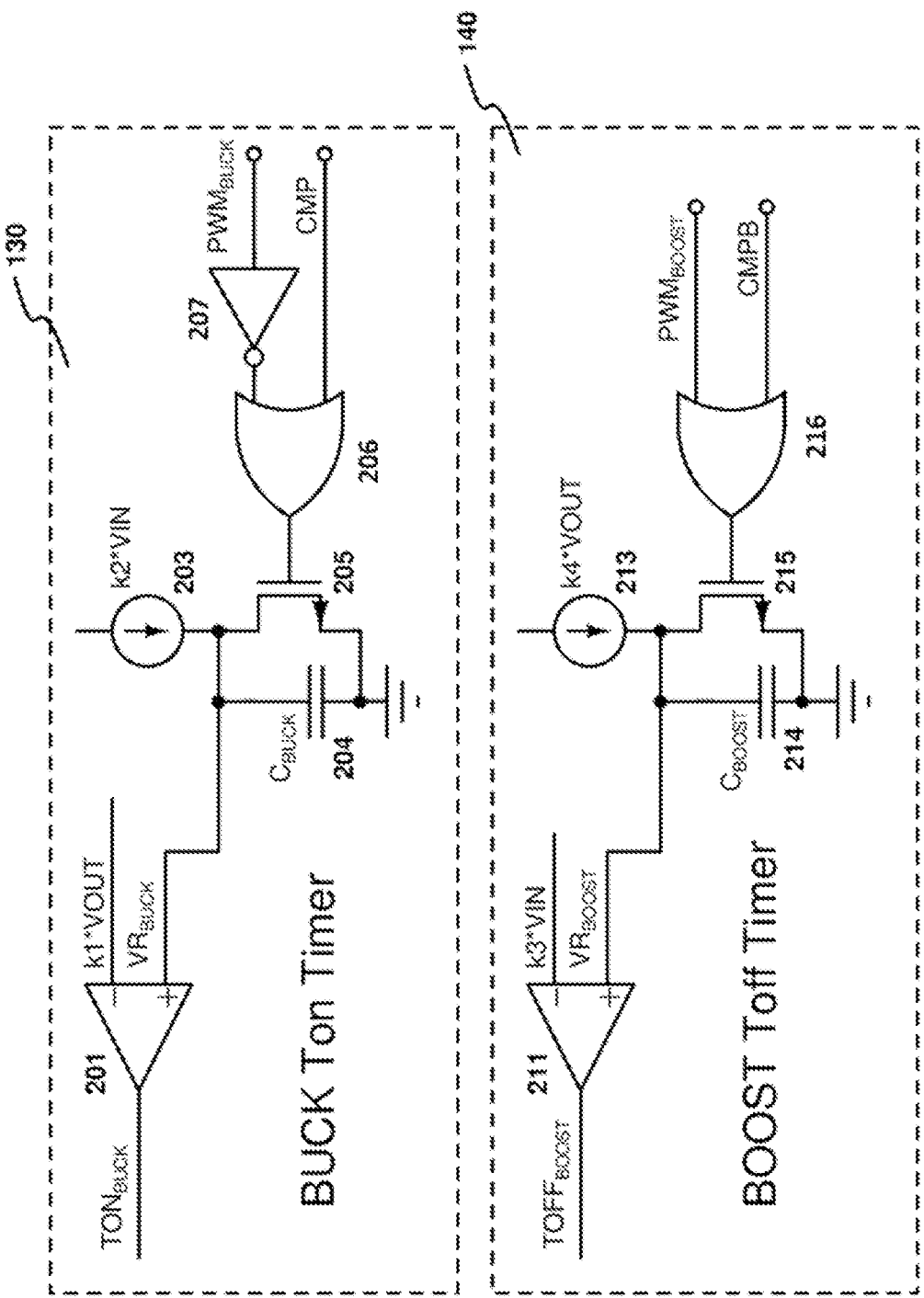
FIG. 2 illustrates schematic diagrams of the buck on-time timer and the boost off-time timer in accordance with various embodiments of the present disclosure.

FIG. 2 illustrates schematic diagrams of the buck on-time timer and the boost off-time timer in accordance with various embodiments of the present disclosure. In some embodiments, the buck on-time timer 130 is configured to calculate the on time of the buck converter portion. The on time of the buck converter portion is the on time of the first high-side switch Q1. The boost off-time timer 140 is configured to calculate the off time of the boost converter portion. The off time of the boost converter portion is the off time of the second low-side switch Q3.

As shown in FIG. 2, the buck on-time timer 130 includes a current source 203, a capacitor 204, a switch 205, a comparator 201, an OR gate 206 and an inverter 207. As shown in FIG. 2, the current level of the current source 203 is proportional to the input voltage VIN. In some embodiments, k2 is a predetermined coefficient. The current source 203 is used to charge the capacitor 204. The voltage across the capacitor 204 is a voltage ramp. The voltage ramp across the capacitor 204 is denoted as $VR_{BUCK}$ as shown in FIG. 2. Throughout the description, the capacitor 204 may be alternatively referred to as a ramp capacitor.

The voltage ramp across the capacitor 204 is fed into a non-inverting input of the comparator 201. The inverting input of the comparator 201 is connected to a threshold voltage, which is proportional to the output voltage. In some embodiments, k1 is a predetermined coefficient. The gate of the switch 205 is controlled by the output signal of the OR gate 206. As shown in FIG. 2, the OR gate 206 is configured to receive the PWM signal ($PWM_{BUCK}$) generated by the first latch 111 through the inverter 207 and the CMP signal. The combination of the $PWM_{BUCK}$ and CMP signals determines the reset of the capacitor 204 as shown in FIG. 2.

As shown in FIG. 2, the voltage ramp $VR_{BUCK}$ is compared with the threshold voltage at the comparator 201. After the voltage ramp $VR_{BUCK}$ reaches the threshold voltage, the output of the comparator 201 generates a termination signal $TON_{BUCK}$ of the on-time of the buck converter portion (a termination signal for turning off the switch Q1).

The turn-on time of the high-side switch Q1 or the turn-off time of the low-side switch Q2 is determined by the comparison result between the voltage ramp $VR_{BUCK}$ and the threshold voltage. The on-time of the high-side switch Q1 (or the turn-off time of the low-side switch Q2) satisfies the following equation:

$$T_{ONBUCK} = C_{BUCK} \cdot \frac{k1 \cdot VOUT}{k2 \cdot VIN} \qquad (1)$$

where $C_{BUCK}$ is the capacitance of capacitor 204, and k1 and k2 are predetermined parameters.

The boost off-time timer 140 includes a current source 213, a capacitor 214, a switch 215, a comparator 211 and an OR gate 216. As shown in FIG. 2, the current level of the current source 213 is proportional to the output voltage VOUT. In some embodiments, k4 is a predetermined coefficient. The current source 213 is used to charge the capacitor 214. The voltage across the capacitor 214 is a voltage ramp. The voltage ramp across the capacitor 214 is denoted as $VR_{BOOST}$ as shown in FIG. 2. Throughout the description, the capacitor 214 may be alternatively referred to as a ramp capacitor.

The voltage ramp across the capacitor 214 is fed into a non-inverting input of the comparator 211. The inverting input of the comparator 211 is connected to a threshold voltage, which is proportional to the input voltage VIN. In some embodiments, k3 is a predetermined coefficient. The gate of the switch 215 is controlled by the output signal of the OR gate 216. As shown in FIG. 2, the OR gate 216 is configured to receive the PWM signal ($PWM_{BOOST}$) generated by the second latch 119 and the CMPB signal. The combination of the $PWM_{BOOST}$ and CMPB signals determines the reset of the capacitor 214.

The voltage across the capacitor 214 is compared with the threshold voltage at the comparator 211. After the voltage across the capacitor 214 reaches the threshold voltage, the output of the comparator 211 generates a termination signal $TOFF_{BOOST}$ of the off-time of the boost converter portion.

The turn-off time of the low-side switch Q3 or the turn-on time of the high-side switch Q4 is determined by the comparison result between the voltage across the capacitor 214 and the threshold voltage. The off-time of the low-side switch Q3 (or the turn-on time of the high-side switch Q4) satisfies the following equation:

$$T_{OFFBOOST} = C_{BOOST} \cdot \frac{k3 \cdot VIN}{k4 \cdot VOUT} \qquad (2)$$

where $C_{BOOST}$ is the capacitance of capacitor 214, and k3 and k4 are predetermined parameters.

In the equations above, k1 and k3 are voltage scaling factors, and k2 and k4 are voltage to current scaling factors. By choosing different scaling factors, $TON_{BUCK}/TOFF_{BOOST}$ and corresponding switching frequency can be adjusted accordingly.

Figure 3:
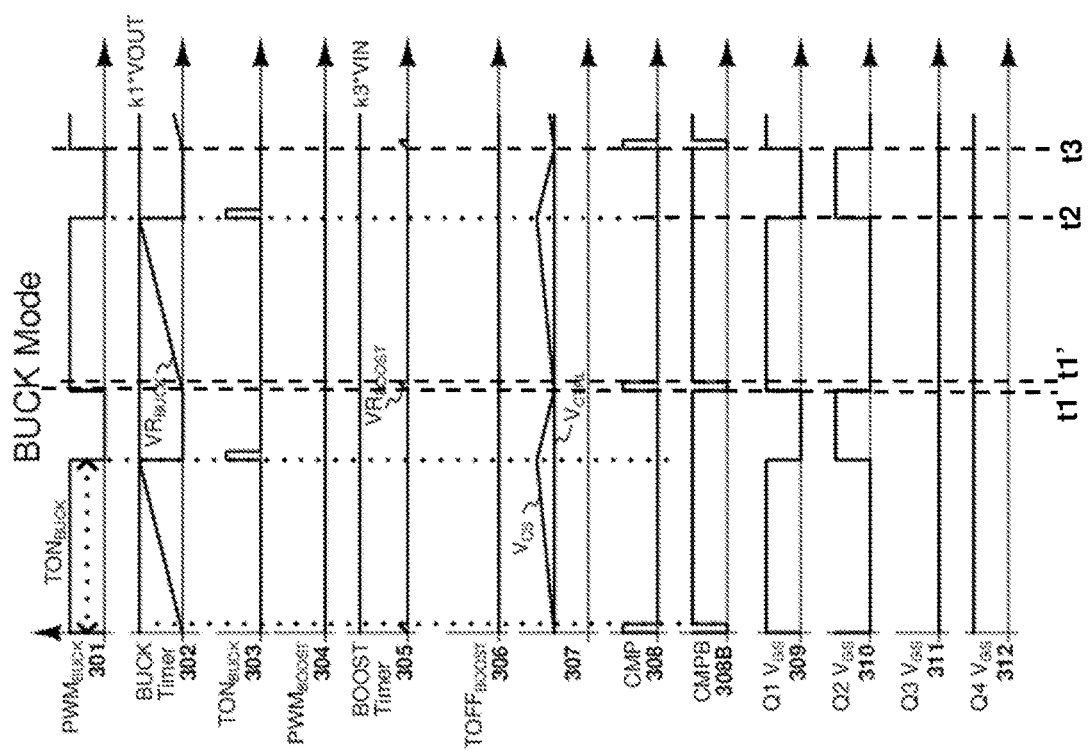
FIG. 3 illustrates timing diagrams associated with the buck operating mode of the buck-boost converter shown in FIG. 1 in accordance with various embodiments of the present disclosure.

FIG. 3 illustrates timing diagrams associated with the buck operating mode of the buck-boost converter shown in FIG. 1 in accordance with various embodiments of the present disclosure. The horizontal axis of FIG. 3 represents intervals of time. There are twelve rows. The first row 301 represents the PWM signal ($PWM_{BUCK}$) generated by the first latch 111. The second row 302 represents the threshold voltage (k1·VOUT) and the ramp ($VR_{BUCK}$) fed into the comparator 201. The third row 303 represents the output voltage ($TON_{BUCK}$) of the comparator 201. The fourth row 304 represents the PWM signal ($PWM_{BOOST}$) generated by the second latch 119. The fifth row 305 represents the threshold voltage (k3·VIN) and the ramp ($VR_{BOOST}$) fed into the comparator 211. The sixth row 306 represents the output voltage ($TOFF_{BOOST}$) of the comparator 211. The seventh row 307 represents the detected current signal (CS) and the error amplifier voltage ($V_{CTRL}$) fed into the current comparator 114. The eighth row includes two rows. Row 308 represents the output voltage (CMP) of the inverter 135. Row 308B represents the output voltage (CMPB) of the current comparator 114. The ninth row 309 represents the gate drive signal of the switch Q1. The tenth row 310 represents the gate drive signal of the switch Q2. The eleventh row 311 represents the gate drive signal of the switch Q3. The twelfth row 312 represents the gate drive signal of the switch Q4.

In operation, when the input voltage VIN of the buck-boost converter is much higher than the output voltage VOUT of the buck-boost converter, the output voltage $V_{CTRL}$ of the error amplifier is lower than the sensed inductor current signal $V_{CS}$. In response to the relationship between $V_{CTRL}$ and $V_{CS}$, as shown in FIG. 3, in a majority time (from t1' to t3) of a switching period (from t1 to t3), the CMPB signal is high and the CMP signal is low. As shown in FIG. 3, the CMPB signal is a pulse having a logic high from t1' to t3. The CMP signal is a pulse having a logic high state from t1 to t1'. Referring back to FIG. 2, the long pulse of the CMPB signal disables the boost off-time timer 140 from t1' to t3. The logic low state of the CMP signal enables the buck on-time timer 130 from t1' to t3. Since the boost off-timer 240 is disabled from t1' to t3, $VR_{BOOST}$ is only activated in a short time period from t1 to t1'. In such a short time period, $VR_{BOOST}$ is always lower than k3·VIN. As a result, the signal $TOFF_{BOOST}$ is at a logic low state, which generates a logic low state at $PWM_{BOOST}$. In response to this logic low state at $PWM_{BOOST}$, the high-side switch Q4 is always on and the low-side switch Q3 is always off. The on-time of the buck converter portion (the turn-on time of Q1) is determined by the buck on-time timer 130. The buck-boost converter operates in the buck operating mode.

Referring back to FIG. 1, in the buck operating mode, the current sensing amplifier 113 is configured to detect the current of Q1 (the current flowing through inductor 104). According to the valley current mode control, Q1 is turned on at t1 when the output of the current sensing amplifier 113 reaches the control voltage $V_{CTRL}$ of the comparator 114. After Q1 has been turned on, the buck on-time timer 130 starts to count. Once the buck on-time timer 130 triggers at t2, Q1 is turned off and Q2 is turned on. Once the output of the current sensing amplifier 113 reaches the control voltage $V_{CTRL}$ of the comparator 114 at t3, Q2 is turned off and Q1 is turned on again to start another cycle.

At the time instant t1, the output of the current sensing amplifier 113 (CS in FIG. 3) drops and reaches the control voltage $V_{CTRL}$ of the comparator 114. Referring back to FIG. 1, at the time instant t1, the output of the comparator 114 generates a logic level "0" (CMPB) and sends this logic level "0" to the inverter 135. The inverter 135 generates a logic level "1" (CMP) and sends this logic level "1" the set input of the first latch 111. According to the operating principle of the R-S latch, the output of the comparator 114 determines the turn-on edge of the gate drive signal of Q1.

As shown in FIG. 3, at the time instant t1, Q2 has been turned off and Q1 has been turned on. It should be noted that there is a suitable delay between the turn-on of Q1 and the turn-off of Q2. As a result of the turn-on of Q1, the sense current CS increases in a linear manner from the time instant t1 to the time instant t2. From the time instant t1 to the time instant t2, the control signal $PWM_{BUCK}$ is of a logic high state and CMP is of a logic low state. The combination of the $PWM_{BUCK}$ and CMP signals turns off the switch 205 of the ramp generation circuit shown in FIG. 2. As a result, the ramp capacitor 204 is charged, and the voltage ($VR_{BUCK}$) across the capacitor 204 increases in a linear manner from the time instant t1 to the time instant t2. During the buck operating mode, the boost off-time timer is never triggered. The boost ramp ($VR_{BOOST}$) is reset by the output of the comparator 114 (CMPB in FIG. 3).

At the time instant t2, the ramp voltage $VR_{BUCK}$ reaches the threshold voltage k1·VOUT. The output of the comparator 201 generates a logic level "1" ($TON_{BUCK}$) and sends this logic level "1" to the reset input of the first latch 111. According to the operating principle of the R-S latch, the output of the comparator 201 determines the turn-off edge of the gate drive signal of Q1.

As shown in FIG. 3, at the time instant t2, the logic level "1" and the logic level "0" are applied to the gates of Q2 and Q1 respectively through the buck control logic unit 210. As a result of the turn-on of Q2 and the turn-off of Q1, the detected current signal CS decreases in a linear manner from the time instant t2 to the time instant t3, and the ramp capacitor 204 is discharged.

At the time instant t3, the output of the current sensing amplifier 113 (CS in FIG. 3) reaches the control voltage $V_{CTRL}$ of the comparator 114 again. The buck-boost converter enters into a new switching period.

Figure 4:
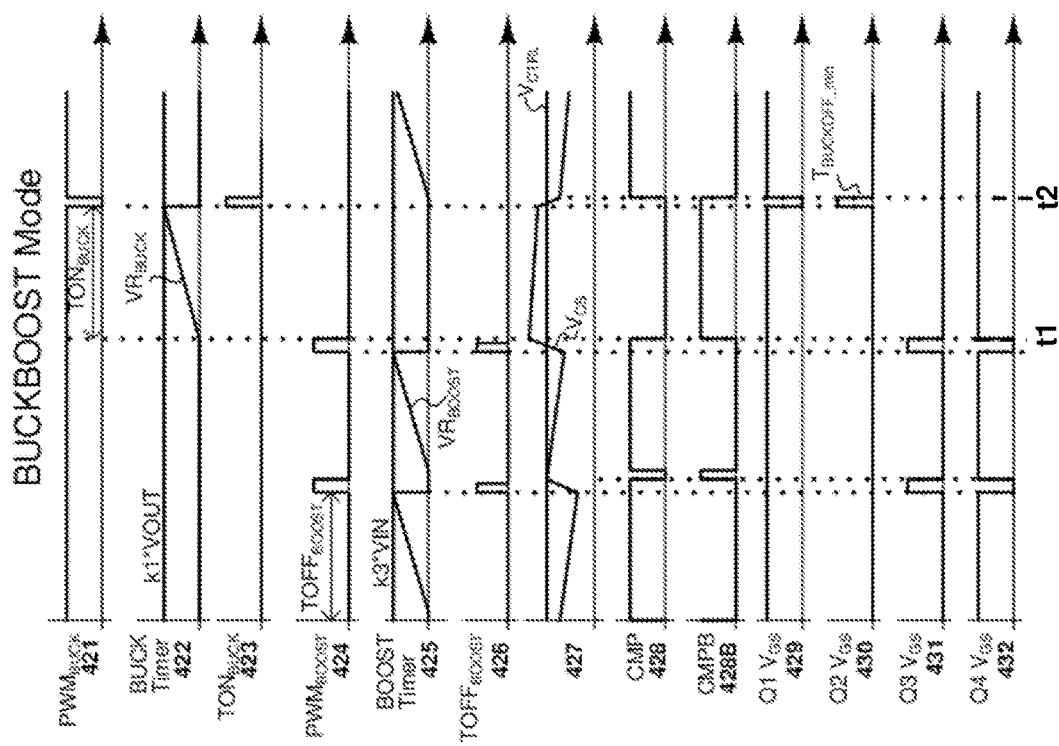
FIG. 4 illustrates timing diagrams associated with the buck-boost operating mode of the buck-boost converter shown in FIG. 1 in accordance with various embodiments of the present disclosure.

FIG. 4 illustrates timing diagrams associated with the buck-boost operating mode of the buck-boost converter shown in FIG. 1 in accordance with various embodiments of the present disclosure. The horizontal axis of FIG. 4 represents intervals of time. There are twelve rows 421-432 similar to rows 301-312 of FIG. 3, and hence are discussed again.

In operation, when the input voltage VIN drops to a level approximately equal to the output voltage VOUT, the buck-boost converter operates in a mode combining the buck operating mode and the boost operating mode. The relationship between the error amplifier voltage $V_{CTRL}$ and the detected current signal $V_{CS}$ determines which mode the buck-boost converter operates in. For example, when $V_{CS}$ is higher than $V_{CTRL}$, the buck-boost converter operates in the buck operating mode. The buck on-time timer 130 is an active timer, and this active timer controls the on and off of Q1 and Q2. At the same time, the boost off-time timer 140 is disabled to keep Q4 on and Q3 off. In the case when the input voltage VIN is lower than (or close to) the output voltage VOUT, the current operating mode (buck operating mode) is not able to regulate the output voltage. The output voltage drops accordingly. In response to the drop of the output voltage, the error amplifier increases $V_{CTRL}$. When $V_{CTRL}$ increases above $V_{CS}$, the boost off-time timer 140 is activated to control the on and off of Q3 and Q4. At the same time, the buck on-time timer 130 is disabled to keep Q1 on and Q2 off. In this case, the buck-boost converter operates in the boost operating mode. Depending on the relationship between $V_{CTRL}$ and $V_{CS}$, the buck-boost converter operates in the buck operating mode and the boost operating mode in an alternating manner, thereby keeping the output of the buck-boost converter regulated.

The timing diagram of FIG. 4 shows the operating principle of the buck-boost operating mode. From the time instant t1 to the time instant t2, $V_{CS}$ is higher than $V_{CTRL}$. The output voltage (CMPB) of the current comparator 114 is high. The high output disables the boost off-time timer 140. The buck-boost converter operates in the buck operating mode. At the time instant t2, $V_{CS}$ is lower than $V_{CTRL}$. The output voltage (CMPB) of the current comparator 114 is low, and the output voltage (CMP) of the inverter 135 is high. The high output (CMP) disables the buck on-time timer 130. The buck-boost converter operates in the boost operating mode. As shown in FIG. 4, the buck-boost converter operates in the buck operating mode and the boost operating mode in a complementary manner. In particular, FIG. 4 shows the buck-boost converter operates in the boost operating mode in two consecutive switching cycles prior to t1. At t1, the buck-boost converter leaves the boost operating mode and operates in the buck operating mode in one switching cycle. At t2, the buck-boost converter returns to the boost operating mode again.

One advantageous feature of the hybrid control scheme is the buck-boost converter is able to have an autonomous and smooth transition between the buck operating mode and the boost operating mode as shown in FIG. 4.

Figure 5:
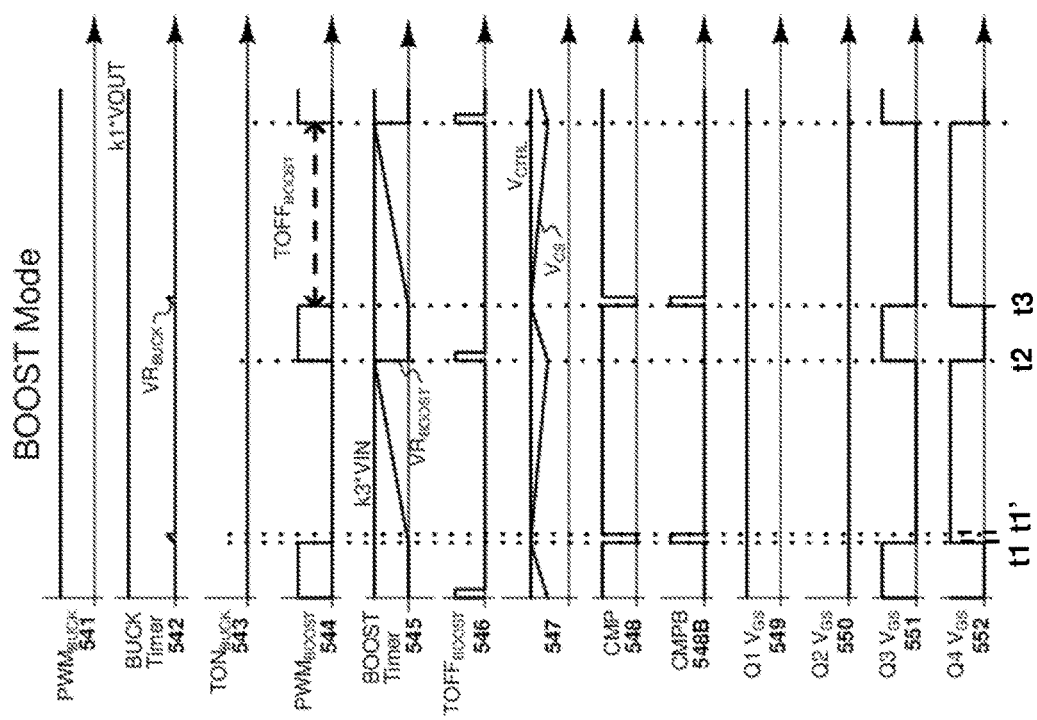
FIG. 5 illustrates timing diagrams associated with the boost operating mode of the buck-boost converter shown in FIG. 1 in accordance with various embodiments of the present disclosure.

FIG. 5 illustrates timing diagrams associated with the boost operating mode of the buck-boost converter shown in FIG. 1 in accordance with various embodiments of the present disclosure. The horizontal axis of FIG. 5 represents intervals of time. There are twelve rows 541-552 similar to rows 301-312 of FIG. 3, and hence are discussed again.

In operation, when the input voltage VIN drops to a predetermined level below the output voltage VOUT, the output voltage $V_{CTRL}$ of the error amplifier is higher than the sensed inductor current signal $V_{CS}$. In response to the relationship between $V_{CTRL}$ and $V_{CS}$, as shown in FIG. 5, in a majority time (from t1' to t3) of a switching period (from t1 to t3), the CMP signal is high and the CMPB signal is low. As shown in FIG. 5, the CMP signal is a pulse having a logic high from t1' to t3. The CMPB signal is a pulse having a logic high state from t1 to t1'. Referring back to FIG. 2, the long pulse of the CMP signal disables the buck on-time timer 130 from t1' to t3. The logic low state of the CMPB signal enables the boost off-time timer 140 from t1' to t3. Since the buck on-timer 130 is disabled from t1' to t3, $VR_{BUCK}$ is only activated in a short time period from t1 to t1'. In such a short time period, $VR_{BUCK}$ is always lower than k1·VOUT. As a result, the signal $TON_{BUCK}$ is at a logic low state. The logic low state does not reset the first latch 111. As a result, the first latch 111 generates a logic high state at $PWM_{BUCK}$. In response to this logic high state at $PWM_{BUCK}$, the high-side switch Q1 is always on and the low-side switch Q2 is always off.

The timing diagram of FIG. 5 shows the operating principle of the boost operating mode. At the time instant t1, the output of the current sensing amplifier 113 (CS in FIG. 5) reaches the control voltage $V_{CTRL}$ of the comparator 114. As discussed above with respect to FIG. 1, at the time instant t1, the output (CMPB in FIG. 5) of the comparator 114 generates a logic level "1" and sends this logic level "1" to the reset input of the second latch 119 (shown in FIG. 1). According to the operating principle of the R-S latch, the output of the comparator 114 determines the turn-off edge of the gate drive signal of Q3.

As shown in FIG. 5, at the time instant t1, Q3 has been turned off. After a suitable delay, Q4 is turned on. As a result of the turn-on of Q4, the sense current CS decreases in a linear manner from the time instant t1 to the time instant t2.

From the time instant t1 to the time instant t2, the control signal $PWM_{BOOST}$ is of a logic low state. In addition, CMPB is of a logic low state. The combination of $PWM_{BOOST}$ and CMPB turns off the switch 215 of the ramp generation circuit shown in FIG. 2. As a result, the ramp capacitor 214 is charged, and the voltage ($VR_{BOOST}$) across the capacitor 214 increases in a linear manner from the time instant t1 to the time instant t2.

At the time instant t2, the ramp voltage $VR_{BOOST}$ reaches the threshold voltage. The output ($TOFF_{BOOST}$) of the comparator 211 generates a logic level "1" and sends this logic level "1" to the reset input of the second latch 119. According to the operating principle of the R-S latch, the output ($TOFF_{BOOST}$) of the comparator 211 determines the turn-off edge of the gate drive signal of Q3.

As shown in FIG. 5, the logic level "0" and the logic level "1" are applied to the gates of Q3 and Q4 respectively through the boost control logic unit 112. As a result of the turn-off of Q3 and the turn-on of Q4, the sense current CS increases in a linear manner from the time instant t2 to the time instant t3. The ramp capacitor 214 is discharged at the time instant t2. At the time instant t3, the output of the current sensing amplifier 113 (CS in FIG. 3) reaches the control voltage $V_{CTRL}$ of the comparator 114 again. The buck-boost converter enters into a new switching period.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a buck converter portion of a buck-boost converter configured to operate under a constant on-time control scheme, wherein an on-time of a high-side switch of the buck converter portion is determined by a buck on-time timer, wherein the buck on-time timer is configured to determine a turn-off edge of a gate drive signal applied to the high-side switch of the buck converter portion of the buck-boost converter, wherein a comparator of the buck on-time timer comprises a first input configured to receive a first ramp, and a second input configured to receive a first threshold voltage, and wherein the first ramp is generated by a first current source having a current level proportional to an input voltage of the buck-boost converter, and the first threshold voltage is proportional to an output voltage of the buck-boost converter; and
    a boost converter portion of the buck-boost converter configured to operate under a constant off-time control scheme, wherein an off-time of a low-side switch of the boost converter portion is determined by a boost off-time timer.

2. The apparatus of claim 1, wherein:
the buck converter portion comprises a first high-side switch and a first low-side switch connected in series between two input terminals of the buck-boost converter, wherein the first high-side switch is the high-side switch of the buck converter portion;
the boost converter portion comprises a second high-side switch and a second low-side switch connected in series between two output terminals of the buck-boost converter, wherein the second low-side switch is the low-side switch of the boost converter portion; and
an inductor is connected between a common node of the first high-side switch and the first low-side switch, and a common node of the second high-side switch and the second low-side switch.

3. The apparatus of claim 1, wherein:
the boost off-time timer is configured to determine a turn-off edge of a gate drive signal applied to a high-side switch of the boost converter portion of the buck-boost converter, wherein a comparator of the boost off-time timer comprises a first input configured to receive a second ramp, a second input configured to receive a second threshold voltage, and wherein the second ramp is generated by a second current source having a current level proportional to the output voltage of the buck-boost converter, and the second threshold voltage is proportional to the input voltage of the buck-boost converter.

4. The apparatus of claim 3, wherein:
a turn-off edge of a gate drive signal applied to a low-side switch of the buck converter portion of the buck-boost converter and a turn-off edge of a gate drive signal applied to the low-side switch of the boost converter portion of the buck-boost converter are determined by a comparator of the apparatus, and wherein the comparator of the apparatus has a first input configured to receive an output voltage of an error amplifier and a second input configured to receive a signal proportional to a current flowing through an inductor of the buck-boost converter.

5. The apparatus of claim 4, wherein:
the error amplifier has a first input connected to a predetermined reference and a second input configured to detect the output voltage of the buck-boost converter.

6. The apparatus of claim 1, wherein:
the buck-boost converter is configured to operate in a buck mode in response to an input voltage greater than an output voltage, and wherein in the buck mode, the low-side switch of the boost converter portion is always off and a high-side switch of the boost converter portion is always on.

7. The apparatus of claim 1, wherein:
the buck-boost converter is configured to operate in a boost mode in response to an input voltage less than an output voltage, and wherein in the boost mode, a low-side switch of the buck converter portion is always off and the high-side switch of the buck converter portion is always on.

8. The apparatus of claim 1, wherein:
the buck-boost converter is configured to operate in a buck-boost mode in response to an input voltage of the buck-boost converter approximately equal to an output voltage of the buck-boost converter, and wherein in the buck-boost mode, the buck-boost converter operates in a buck mode and a boost mode in a complementary manner.

9. The apparatus of claim 8, wherein:
in the buck-boost mode, based on a relationship between a sensed current signal and an error amplifier output voltage signal, the buck-boost converter automatically transitions between the buck mode and the boost mode.

10. The apparatus of claim 9, wherein:
the buck-boost converter is configured to operate in the buck mode when the sensed current signal is greater than the error amplifier output voltage signal; and
the buck-boost converter is configured to operate in the boost mode when the sensed current signal is less than the error amplifier output voltage signal.

11. A method comprising:
applying a constant on-time control scheme to a buck converter portion of a buck-boost converter, wherein under the constant on-time control scheme, an on-time of a high-side switch of the buck converter portion is determined by a buck on-time timer;
in the buck on-time timer, generating a first ramp using a first current source having a current level proportional to an input voltage of the buck-boost converter, generating a first threshold voltage proportional to an output voltage of the buck-boost converter, comparing the first threshold voltage with the first ramp using a first comparator, and terminating a gate drive signal of the high-side switch of the buck converter portion of the buck-boost converter based upon a comparing result generated by the first comparator;
applying a constant off-time control scheme to a boost converter portion of the buck-boost converter, wherein under the constant off-time control scheme, an off-time of a low-side switch of the boost converter portion is determined by a boost off-time timer; and
in the boost off-time timer, generating a second ramp using a second current source having a current level proportional to an output voltage of the buck-boost converter, generating a second threshold voltage proportional to the input voltage of the buck-boost converter, comparing the second threshold voltage with the second ramp using a second comparator, and terminating a gate drive signal of a high-side switch of the boost converter portion of the buck-boost converter based upon a comparing result generated by the second comparator.

12. The method of claim 11, further comprising:
generating a current sense signal proportional to a current flowing through an inductor of the buck-boost converter;
comparing a detected output voltage of the buck-boost converter with a predetermined reference using an error voltage amplifier;
comparing the current sense signal with an output voltage of the error voltage amplifier using a comparator; and
terminating an on-time of a low-side switch of the buck converter portion of the buck-boost converter, and an on-time of a low-side switch of the boost converter portion of the buck-boost converter based upon a comparing result generated by the comparator.

13. The method of claim 12, further comprising:
configuring the buck-boost converter to operate in a buck operating mode when an input voltage of the buck-boost converter is greater than an output voltage of the buck-boost converter, wherein in the buck operating mode, the boost off-time timer is disabled based on the comparing result generated by the comparator.

14. The method of claim 13, further comprising:
configuring the buck-boost converter to operate in a boost operating mode when the input voltage of the buck-boost converter is less than the output voltage of the buck-boost converter, wherein in the boost operating mode, the buck on-time timer is disabled based on the comparing result generated by the comparator.

15. The method of claim 13, further comprising:
configuring the buck-boost converter to operate in a buck-boost operating mode when the input voltage of the buck-boost converter is approximately equal to the output voltage of the buck-boost converter, wherein in the buck-boost operating mode, based on the comparing result generated by the comparator, the buck on-time timer and the boost off-time timer are enabled/disabled in a complementary manner.

16. A controller comprising:
a first timer for setting a turn-on time of a first high-side switch of a buck-boost converter, wherein the turn-on time of the first high-side switch is determined by an input voltage of the buck-boost converter and an output voltage of the buck-boost converter, wherein a comparator of the first timer comprises a first input configured to receive a first ramp and a second input configured to receive a first threshold voltage, and wherein the first ramp is generated by a first current source having a current level proportional to the input voltage of the buck-boost converter, and the first threshold voltage is proportional to the output voltage of the buck-boost converter;
a second timer for setting a turn-off time of a second low-side switch of the buck-boost converter, wherein the turn-off time of the second low-side switch is determined by the input voltage of the buck-boost converter and the output voltage of the buck-boost converter, wherein a comparator of the second timer comprises a first input configured to receive a second ramp and a second input configured to receive a second threshold voltage, and wherein the second ramp is generated by a second current source having a current level proportional to the output voltage of the buck-boost converter, and the second threshold voltage is proportional to the input voltage of the buck-boost converter; and
a current mode control device for setting a turn-on time of a first low-side switch and a turn-off time of a second high-side switch of the buck-boost converter.

17. The controller of claim 16, wherein:
a turn-off edge of a gate drive signal applied to the first low-side switch of the buck-boost converter and a turn-off edge of a gate drive signal applied to the second high-side switch of the buck-boost converter are determined by an output of a comparator, and wherein the comparator has a first input configured to receive an output voltage of an error amplifier and a second input configured to receive a signal proportional to a current flowing through an inductor of the buck-boost converter.

18. The controller of claim 16, wherein the buck-boost converter comprises:
the first high-side switch and the first low-side switch connected in series between two input terminals of the buck-boost converter;
the second high-side switch and the second low-side switch connected in series between two output terminals of the buck-boost converter; and
an inductor is connected between a common node of the first high-side switch and the first low-side switch, and a common node of the second high-side switch and the second low-side switch.

* * * * *